(12) United States Patent
Miyano

(10) Patent No.: US 10,450,474 B2
(45) Date of Patent: Oct. 22, 2019

(54) ACTIVE LIGHT RAY-CURABLE INKJET INK COMPOSITION AND INKJET RECORDING METHOD

(71) Applicant: Konica Minolta, Inc., Chiyoda-ku Tokyo (JP)

(72) Inventor: Masashi Miyano, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/772,282

(22) PCT Filed: Oct. 27, 2016

(86) PCT No.: PCT/JP2016/081856
§ 371 (c)(1),
(2) Date: Apr. 30, 2018

(87) PCT Pub. No.: WO2017/073654
PCT Pub. Date: May 4, 2017

(65) Prior Publication Data
US 2018/0371276 A1 Dec. 27, 2018

(30) Foreign Application Priority Data
Oct. 30, 2015 (JP) ................................. 2015-213942

(51) Int. Cl.
| | | |
|---|---|---|
| *B41J 2/01* | (2006.01) | |
| *C09D 11/38* | (2014.01) | |
| *B41M 5/00* | (2006.01) | |
| *C09D 11/326* | (2014.01) | |
| *C09D 11/34* | (2014.01) | |
| *B41J 11/00* | (2006.01) | |
| *C09D 11/033* | (2014.01) | |
| *C09D 11/101* | (2014.01) | |
| *C09D 11/107* | (2014.01) | |

(52) U.S. Cl.
CPC ................. *C09D 11/38* (2013.01); *B41J 2/01* (2013.01); *B41J 11/002* (2013.01); *B41M 5/00* (2013.01); *B41M 5/0023* (2013.01); *C09D 11/033* (2013.01); *C09D 11/101* (2013.01); *C09D 11/107* (2013.01); *C09D 11/326* (2013.01); *C09D 11/34* (2013.01)

(58) Field of Classification Search
CPC ........... B41J 2/01; B41J 11/002; C09D 11/38; C09D 11/326; C09D 11/34; C09D 11/033; C09D 11/101; C09D 11/107
See application file for complete search history.

(56) References Cited

U.S. PATENT DOCUMENTS

| | | |
|---|---|---|
| 2008/0063981 A1 | 3/2008 | Ohnishi |
| 2010/0075119 A1 | 3/2010 | Ohnishi |
| 2011/0074897 A1 | 3/2011 | Araki |
| 2014/0333704 A1 | 11/2014 | Takabayashi et al. |

FOREIGN PATENT DOCUMENTS

| | | |
|---|---|---|
| EP | 1882724 A1 | 7/2007 |
| JP | 2011021118 A | 2/2011 |
| JP | 2011068783 A | 4/2011 |
| JP | 2013173907 A | 9/2013 |
| JP | 2015048383 A | 3/2015 |
| JP | 2015052082 A | 3/2015 |
| JP | 2015160890 A | 9/2015 |

OTHER PUBLICATIONS

International Search Report corresponding to Application No. PCT/JP2016/081856; dated Dec. 27, 2016.
Extended European Search Report corresponding to Application No. 16859883.7-1102 PCT/JP2016081856; dated Aug. 1, 2018.
Written Opinion of the International Searching Authority corresponding to Application No. PCT/JP2016/081856; dated May 1, 2018.

*Primary Examiner* — Lamson D Nguyen
(74) *Attorney, Agent, or Firm* — Cantor Colburn LLP

(57) ABSTRACT

The purpose of the present invention is to provide an active light ray-curable inkjet ink composition which exhibits excellent curing properties and high storage stability. This active light ray-curable inkjet ink composition contains a curable monomer, a photopolymerization initiator, an amine-modified oligomer, a pigment and a polymer dispersing agent. In this composition, the content of the amine-modified oligomer is 0.5-10 mass % relative to the overall mass of the active light ray-curable inkjet ink composition, the polymer dispersing agent is a compound which adsorbs the pigment and contains a tertiary amine group as a functional group, and the content of the polymer dispersing agent is 20-70 mass % relative to the pigment.

8 Claims, No Drawings

ACTIVE LIGHT RAY-CURABLE INKJET INK COMPOSITION AND INKJET RECORDING METHOD

CROSS REFERENCE TO RELATED APPLICATIONS

This is the U.S. national stage of application No. PCT/JP2016/081856, filed on Oct. 27, 2016. Priority under 35 U.S.C. § 119(a) and 35 U.S.C. § 365(b) is claimed from Japanese Application No. 2015-213942, filed on Oct. 30, 2015, the disclosure of which is also incorporated herein by reference.

TECHNICAL FIELD

The present invention relates to an actinic radiation-curable inkjet ink composition and an inkjet recording process.

BACKGROUND ART

An image forming method using an inkjet recording method is a method for forming an image by jetting an ink supplied from an ink tank through a channel from a recording head for ink-jetting. The inkjet recording method can form an image easily and inexpensively and therefore has been used for forming various images. As one of the inks for use in the inkjet recording method, there is an actinic radiation-curable inkjet ink. The actinic radiation-curable inkjet ink comprises a photocurable compound, and therefore an ink component can be cured by polymerizing the photocurable compound through irradiation with actinic radiation such as ultraviolet rays. When an image is formed using the actinic radiation-curable inkjet ink, it is easier to immobilize an ink jetted and an image with less bleeding can be formed on various recording media than when a solvent-based ink composition is used.

As the demand for the actinic radiation-curable inkjet ink is increasingly expanded, its characteristics are also demanded to be variously improved. Amine compounds and the like are known as an additive for improvements in ink characteristics. For example, PTL 1 discloses an UV ink containing a heterocyclic monomer and a cyclic monofunctional monomer in order that photocuring characteristics and storage stability in a thin film are enhanced without using a large amount of a photopolymerization initiator. PTL 1 also discloses an ink further containing an amine-modified oligomer as an amine compound.

In addition, PTL 2 describes a photocurable inkjet ink in which a branched oligomer is used as a curable oligomer to thereby allow an image high in hardness to be formed without any deterioration in jetting ability, and also describes use of a tertiary amine compound as a photopolymerization initiator aid. While an actinic radiation-curable inkjet ink where polyamine acrylate serving as an amine-modified oligomer is used is described in Comparative Examples in PTL 2, the ink in the Comparative Examples is low in curability.

PTL 3 describes an actinic radiation-curable inkjet ink where an oligomer having a secondary or higher amine group is used as a polymer dispersant. PTL 3 describes an actinic radiation-curable inkjet ink in which the actinic radiation-curable inkjet ink contains a polymer dispersant having a secondary or higher amine group to result in an increase in dispersion stability of a pigment, thereby suppressing surface gloss with sharpness after printing being kept.

CITATION LIST

Patent Literatures

PTL 1
Japanese Patent Application Laid-Open No. 2011-21118
PTL 2
Japanese Patent Application Laid-Open No. 2013-173907
PTL 3
Japanese Patent Application Laid-Open No. 2015-52082

SUMMARY OF INVENTION

Technical Problem

While PTLs 1 and 2 above each describe an actinic radiation-curable inkjet ink containing an amine-modified oligomer, the amine-modified oligomer is a highly reactive compound, and therefore a further improvement has been demanded in storage stability of the ink. While PTL 3 describes an actinic radiation-curable inkjet ink containing an oligomer having an amine, the oligomer having an amine is not a reactive oligomer and is used as a dispersant.

The present invention has been made in view of the above-described circumstances, and an object of the present invention is to provide an actinic radiation-curable inkjet ink composition that is excellent in storage stability with curability being kept.

Solution to Problem

In view of the above-described object, a first aspect of the present invention provides the following actinic radiation-curable inkjet ink compositions.

[1] An actinic radiation-curable inkjet ink composition comprising a curable monomer, a photopolymerization initiator, an amine-modified oligomer, a pigment and a polymer dispersant, wherein a content of the amine-modified oligomer is 0.5 mass % to 10 mass % based on a total mass of the actinic radiation-curable inkjet ink composition, and the polymer dispersant is a compound containing a tertiary amine group and a content of the polymer dispersant is 20 mass % to 70 mass % relative to the pigment.

[2] The actinic radiation-curable inkjet ink composition according to [1], wherein the amine-modified oligomer has a (meth)acryloyl group in a molecule.

[3] The actinic radiation-curable inkjet ink composition according to [1] or [2], wherein the curable monomer is a radical polymerizable monomer, and the photopolymerization initiator is a radical photopolymerization initiator.

[4] The actinic radiation-curable inkjet ink composition according to any one of [1] to [3], wherein the photopolymerization initiator has an absorption maximum at 360 nm or more.

[5] The actinic radiation-curable inkjet ink composition according to any one of [1] to [4], further comprising a gelling agent, wherein
the gelling agent is at least one member selected from the group consisting of aliphatic ketones, aliphatic esters, higher fatty acids, higher alcohols and amide compounds each having a straight or branched carbon chain having 12 or more carbon atoms, a content of the gelling agent is 0.5 mass % to 10 mass % based on the total mass of the actinic radiation-curable inkjet ink composition, and the actinic radiation-curable inkjet ink composition undergoes sol-gel phase transition by the change in temperature.

[6] The actinic radiation-curable inkjet ink composition according to any one of [1] to [5], wherein the gelling agent is at least one member selected from the group consisting of aliphatic ketones and aliphatic esters.

[7] The actinic radiation-curable inkjet ink composition according to any one of [1] to [6], wherein the curable monomer comprises a PO-modified polyfunctional monomer, and a content of the PO-modified polyfunctional monomer is 20 to 60 mass % based on the total mass of the actinic radiation-curable inkjet ink composition.

[8] The actinic radiation-curable inkjet ink composition according to any one of [1] to [7], wherein the curable monomer comprises substantially no monofunctional monomer.

A second aspect of the present invention relates to the following inkjet recording process.

[9] An inkjet recording process comprising:

jetting the actinic radiation-curable inkjet ink composition according to any one of [1] to [8] from a recording head for ink-jetting to thereby deposit the ink composition on a recording medium, and irradiating the actinic radiation-curable inkjet ink composition deposited on the recording medium with actinic radiation to cure the actinic radiation-curable inkjet ink composition.

Advantageous Effects of Invention

The actinic radiation-curable inkjet ink composition of the present invention, containing not only an amine-modified oligomer, but also a compound containing a tertiary amine group, as a polymer dispersant, is excellent in curability and is also considerably enhanced in storage stability as compared with an actinic radiation-curable inkjet ink composition containing only an amine-modified oligomer. Furthermore, in the case of a gel ink composition containing a gelling agent, not only curability and storage stability described above can be achieved, but also the occurrence of blooming (a phenomenon where the gelling agent is precipitated/crystallized on the surface of an image) which is a unique problem for a gel ink composition can be suppressed.

DESCRIPTION OF EMBODIMENTS

The actinic radiation-curable inkjet ink composition of the present invention (in the present invention, referred to as an "inkjet ink", or also simply referred to as an "ink") contains a curable monomer, a photopolymerization initiator, an amine-modified oligomer, a pigment and a polymer dispersant. The actinic radiation-curable inkjet ink of the present invention is an ink composition that can be cured by actinic radiation. The "actinic radiation" means radiation that can be applied to thereby give energy for generation of an initiation seed in an ink composition, and encompasses α rays, γ rays, X rays, ultraviolet rays, electron beams, and the like. Among them, ultraviolet rays and electron beams are preferable, and ultraviolet rays are more preferable from the viewpoint of curing sensitivity and apparatus availability.

Hereinafter, the present invention and constituent components thereof as well as embodiments/aspects for carrying out the present invention will be described in detail. In the present invention, the term "to" described with numerical values before and after the term is used to mean that the numerical values are included as the lower limit value and the upper limit value. In addition, in the present invention, the term "mass %", unless particularly noted, refers to the content of each component, expressed by mass % under the assumption that the total mass of the actinic radiation-curable inkjet ink composition is 100 mass %.

<Curable Monomer>

The curable monomer is a compound that is to be cross-linked or polymerized by irradiation with actinic radiation. The curable monomer contained in the inkjet ink composition of the present invention is a radical polymerizable monomer or a cationic polymerizable monomer and is preferably a radical polymerizable monomer.

The radical polymerizable monomer is a compound which has an ethylenically unsaturated bond, which is radically polymerizable, and is a compound which has at least one ethylenically unsaturated bond in the molecule, which is radically polymerizable. These radical polymerizable monomers may be used singly or in combination of two or more types thereof at any ratio in order to enhance the intended characteristics.

Examples of the monomer which has an ethylenically unsaturated bond, which is radically polymerizable, include unsaturated carboxylic acids such as acrylic acid, methacrylic acid, itaconic acid, crotonic acid, isocrotonic acid and maleic acid, and salts, esters, urethanes, amides and anhydrides thereof, acrylonitrile, styrene, and various radical polymerizable compounds such as unsaturated polyesters, unsaturated polyethers, unsaturated polyamides and unsaturated urethanes.

The radical polymerizable monomer contained in the inkjet ink composition of the present invention can be any known monomer having a (meth)acryloyl group. The monomer having a (meth)acryloyl group may be a monofunctional monomer, or may be a bifunctional or higher-functional polyfunctional monomer, and is preferably a polyfunctional monomer as described later.

Examples of the monofunctional monomer include isoamyl acrylate, stearyl acrylate, lauryl acrylate, octyl acrylate, decyl acrylate, isomyristyl acrylate, isostearyl acrylate, 2-ethylhexyl-diglycol acrylate, 2-hydroxybutyl acrylate, 2-acryloyloxyethyl hexahydrophthalate, butoxyethyl acrylate, ethoxy diethylene glycol acrylate, methoxy diethylene glycol acrylate, methoxy polyethylene glycol acrylate, methoxy propylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethyl succinate, 2-acryloyloxyethyl phthalate, 2-acryloyloxyethyl-2-hydroxyethylphthalate, lactone-modified thermoplastic acrylate and t-butylcyclohexyl acrylate.

Examples of the bifunctional monomer include triethylene glycol diacrylate, tetraethylene glycol diacrylate, polyethylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, hydroxy pivalic acid neopentyl glycol diacrylate and polytetramethylene glycol diacrylate.

Examples of the trifunctional or higher-functional monomer include trimethylolpropane triacrylate, pentaerythritol triacrylate, EO-modified trimethylolpropane triacrylate, pentaerythritol tetraacrylate, EO-modified pentaerythritol tetraacrylate, dipentaerythritol hexaacrylate, ditrimethylolpropane tetraacrylate, glycerin propoxy triacrylate, caprolactone-modified trimethylolpropane triacrylate, pentaerythritolethoxy tetraacrylate and caprolactam-modified dipentaerythritol hexaacrylate.

Examples of commercially available radical polymerizable monomers include NK ester A-400 (manufactured by Shin-Nakamura Chemical Co., Ltd.), SR 499 (manufactured by Sartomer), SR 494 (manufactured by Sartomer) and Miramer M600 (manufactured by Miwon Specialty Chemical Co., Ltd.).

The cationic polymerizable monomer can be an epoxy compound, a vinyl ether compound, an oxetane compound, or the like. These cationic polymerizable monomers may be used singly or in combination of two or more types thereof.

The epoxy compound refers to an aromatic epoxide, an alicyclic epoxide, an aliphatic epoxide, or the like, and the aromatic epoxide and the alicyclic epoxide are preferable in order to improve curability.

The aromatic epoxide can be a diglycidyl ether or a polyglycidyl ether obtained by reacting a polyhydric phenol or an alkylene oxide adduct thereof with epichlorohydrin. Examples of the polyhydric phenol or the alkylene oxide adduct thereof which is subjected to the reaction include bisphenol A or an alkylene oxide adduct thereof. The alkylene oxide in the alkylene oxide adduct can be ethylene oxide, propylene oxide, or the like.

The alicyclic epoxide can be a cycloalkane oxide-containing compound obtained by epoxidizing a cycloalkane-containing compound with an oxidizing agent such as hydrogen peroxide or a peracid. The cycloalkane in the cycloalkane oxide-containing compound can be cyclohexene or cyclopentene.

The aliphatic epoxide can be a diglycidyl ether or a polyglycidyl ether obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct can be ethylene oxide, propylene oxide, or the like.

Examples of the vinyl ether compound include:
monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether; and divinyl or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether. Among these vinyl ether compounds, divinyl or trivinyl ether compounds are preferable taking curability and adhesion into consideration.

The oxetane compound refers to a compound having an oxetane ring, and examples thereof include oxetane compounds described in Japanese Patent Application Laid-Open Nos. 2001-220526, 2001-310937, and 2005-255821. Examples thereof include a compound represented by Formula (1) described in paragraph [0089] of Japanese Patent Application Laid-Open No. 2005-255821, a compound represented by Formula (2) described in paragraph [0092] thereof, a compound represented by Formula (7) described in paragraph [0107] thereof, a compound represented by Formula (8) described in paragraph [0109] thereof, and a compound represented by Formula (9) described in paragraph [0116] thereof. Formulas (1), (2), and (7) to (9) described in Japanese Patent Application Laid-Open No. 2005-255821 are shown below.

[Formula 1]

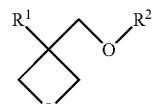

Formula (1)

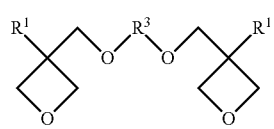

Formula (2)

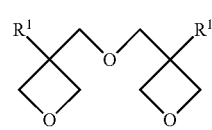

Formula (7)

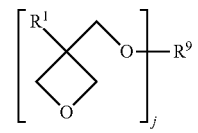

Formula (8)

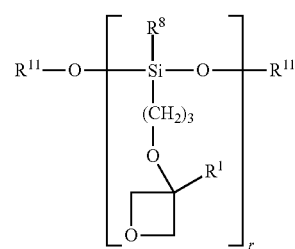

Formula (9)

The content of the curable monomer is preferably from 60 to 96 mass % and is more preferably from 70 to 90 mass % based on the total mass of the actinic radiation-curable inkjet ink composition.

Furthermore, the curable monomer preferably comprises 20 mass % to 60 mass % of a PO-modified polyfunctional monomer based on the total mass of the actinic radiation-curable inkjet ink composition. It is to be noted that the PO-modified polyfunctional monomer means a polyfunctional monomer having a plurality of propylene oxide groups. Specific examples of the PO-modified polyfunctional monomer include PO-modified di(meth)acrylate, PO-modified neopentyl glycol di(meth)acrylate, PO-modified bisphenol A di(meth)acrylate and PO-modified trimethylolpropane tri(meth)acrylate. When the ink composition comprises the PO-modified polyfunctional monomer in the above range, the Tg of the ink is higher than that of an ink containing an unmodified polyfunctional monomer, and it is thus considered that a cured film to be formed by a reaction of the amine-modified oligomer and the curable monomer is harder to impart an enhanced scuffing resistance. It is to be noted that, even when the ink composition contains an ethylene oxide (EO)-modified polyfunctional monomer in the above range, the Tg of such an ink composition is less increased than that of the ink containing the PO-modified polyfunctional monomer, not to impart a sufficiently enhanced scuffing resistance. In addition, if the content of the PO-modified polyfunctional monomer is more than 60 mass %, the ink composition after curing is excessively hard, and thus, when a recording medium with a cured film formed thereon is bent, the cured film is easily broken (deteriorated in bending resistance). In addition, if the content of the PO-modified polyfunctional monomer is less than 20 mass %, dissolution performance for a gelling agent is deteriorated, thereby easily causing deterioration in jetting ability of the ink composition.

When the actinic radiation-curable inkjet ink composition is a composition (in the present invention, also simply referred to as "gel ink composition") containing a gelling agent described later, the PO-modified polyfunctional monomer allows dissolution performance for the gelling agent to be enhanced, easily resulting in an enhancement in jetting ability of the ink composition. In addition, hydrogen on tertiary carbon easily undergoes chain transfer, and it is thus considered that combination use with the amine-modified oligomer allows chain transfer due to hydrogen withdrawing to occur, resulting in an increase in crosslinking density to also impart suppression of blooming. On the other hand, if the content of the PO-modified polyfunctional monomer in the ink composition is more than 60 mass %, the degree of dissolution for the gelling agent is so increased that blooming is easily caused to easily deteriorate image quality. In addition, if the content of the PO-modified polyfunctional monomer is less than 20 mass %, even combination use with the amine-modified oligomer hardly allows chain transfer due to hydrogen withdrawing to occur, and thus blooming is easily caused.

Furthermore, preferably, the curable monomer does not substantially comprise the monofunctional monomer. The phrase "not substantially comprise" here means that the content of the monofunctional monomer is less than 0.1% based on the total mass of the actinic radiation-curable inkjet ink composition. When the ink composition comprises no monofunctional monomer, an increase in crosslinking density is achieved to thereby result in not only an increase in curability, but also a reduction in odor of the cured film and migration inhibition. In addition, when the gel ink composition does not substantially comprise the monofunctional monomer, an increase in crosslinking density is achieved to lead to suppression of blooming.

<Photopolymerization Initiator>

The inkjet ink composition of the present invention contains a photopolymerization initiator from the viewpoint of an increase in reactivity in irradiation with light.

The photopolymerization initiator includes a radical photopolymerization initiator and a cationic photopolymerization initiator, and the radical photopolymerization initiator includes an intramolecular bond cleaving type and an intramolecular hydrogen withdrawing type. Examples of the intramolecular bond cleaving type photopolymerization initiator include: acetophenones such as diethoxy acetophenone, 2-hydroxy-2-methyl-1-phenylpropan-1-one, benzyl dimethyl ketal, 1-(4-isopropylphenyl)-2-hydroxy-2-methyl-propan-1-one, 4-(2-hydroxyethoxy)phenyl-(2-hydroxy-2-propyl) ketone, 1-hydroxycyclohexyl-phenyl ketone, 2-methyl-2-morpholino(4-thiomethylphenyl)propan-1-one, and 2-benzyl-2-dimethylamino-1-(4-morpholinophenyl)-butanone; benzoins such as benzoin, benzoin methyl ether, and benzoin isopropyl ether; acylphosphine oxides such as 2,4,6-trimethylbenzoin diphenylphosphine oxide; benzil, and methylphenyl glyoxyester.

Examples of the intramolecular hydrogen withdrawing type photopolymerization initiator include benzophenones such as benzophenone, o-benzoyl benzoic acid methyl-4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl) benzophenone and 3,3'-dimethyl-4-methoxybenzophenone; thioxanthones such as 2-isopropylthioxanthone, 2,4-dimethylthioxanthone, 2,4-diethylthioxanthone and 2,4-dichlorothioxanthone; aminobenzophenones such as Michler's ketone and 4,4'-diethylaminobenzophenone; 10-butyl-2-chloroacridone, 2-ethylanthraquinone, 9,10-phenanthrenequinone, and camphorquinone.

Examples of the cationic photopolymerization initiator include a photoacid-generating agent. Examples of the photoacid-generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

The content of the photopolymerization initiator in the actinic radiation-curable inkjet ink may vary depending on the types of actinic radiation and the curable monomer, and it is preferably from 0.01 mass % to 10 mass % and is more preferably from 2 to 8 mass %.

When the curable monomer contained in the inkjet ink composition of the present invention is a radical polymerizable monomer, the photopolymerization initiator is also preferably a radical photopolymerization initiator. The radical polymerizable monomer and the radical photopolymerization initiator can be used in combination to thereby perform efficient polymerization.

Among the above-described photopolymerization initiators, a compound having an absorption maximum at 360 nm or more is preferable. Examples of the compound having an absorption maximum at 360 nm or more include acylphosphine oxides such as 2,4,6-trimethylbenzoin diphenylphosphine oxide, and in the present invention, acylphosphine oxides such as 2,4,6-trimethylbenzoin diphenylphosphine oxide are preferable. When the compound having an absorption maximum at 360 nm or more is used as the photopolymerization initiator, curing with a light source low in illuminance, such as LED, can be made, and the effects of suppression of odor, enhancement of safety, and prevention of migration can be expected. The absorption maximum is preferably 410 nm or less from the viewpoint of color tone.

The inkjet ink composition of the present invention may contain, if necessary, a sensitizer or a sensitization aid. Examples of the sensitizer or the sensitization aid to the photopolymerization initiator can include amines not undergoing an addition reaction with the radical polymerizable monomer, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, 4,4'-bis(diethylamino)benzophenone, Michler's ketone, and ethyl 4-(N,N-dimethylamino)benzoate. Of course, with respect to the photopolymerization initiator and the sensitizer or the sensitization aid, those excellent in the dissolution performance in the curable monomer are preferably selected and used.

The content of each of the photopolymerization initiator and the sensitizer is preferably 0.1 to 20 mass % and is more preferably 1 to 12 mass % based on the total mass of the actinic radiation-curable inkjet ink composition.

Others can be preferably used such as one where an amine-based initiation aid as an initiator structure is bound to a dendrimer core, described in EP 1,674,499 A, a photopolymerization initiator having a polymerizable group, and an amine-based initiation aid described in EP 2,161,264 A and EP 2,189,477 A, one having a plurality of amine-based initiation aids in one molecule, described in EP 1,927,632 B1, one containing a plurality of thioxanthones in the molecule, described in WO 2009/060235, and an oligomer type photopolymerization initiator where α-hydroxypropiophenone is bound to a side chain, typified by ESACURE ONE and ESACUR KIP150 commercially available from Lamberti S.p.A.

The inkjet ink composition of the present invention may further contain, if necessary, a polymerization inhibitor and the like. Examples of the polymerization inhibitor include (alkyl)phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-tert-butyl-p-benzoquinone, dithiobenzoyl disulfide, picric acid, cupferrone, aluminum N-nitrosophenyl-hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

<Amine-Modified Oligomer>

The amine-modified oligomer contained in the actinic radiation-curable inkjet ink composition of the present invention is a reactive oligomer having, in the molecule, an amino group and a functional group to be crosslinked or polymerized by irradiation with actinic radiation, and is a compound also referred to as a reactive amine co-initiator, a reactive amine synergist, an acrylate-modified amine synergist, amine acrylate, and the like. An amine-modified oligomer has been conventionally used for the purpose of an enhancement in curability of an ink composition, but has been problematic in terms of its high reactivity to result in deterioration in storage stability of an ink composition. In the present invention, combination use with a polymer dispersant containing a tertiary amine described later has successfully enhanced simultaneously curability and storage stability of the ink composition.

There are many commercially available amine-modified oligomers. Examples include CN371, CN373, CN383, CN386, CN501, CN550 and CN551 manufactured by Sartomer; EBECRYL 80 and EBECRYL 7100 manufactured by Daicel-Allnex Ltd.; GENOMER 5142, GENOMER 5161 and GENOMER 5275 manufactured by RAHN AG; Miramer AS2010 and Miramer AS5142 manufactured by Miwon Specialty Chemical Co., Ltd.; and Etercure 641, Etercure 6410, Etercure 6411, Etercure 6412, Etercure 6413, Etercure 6417, Etercure 6420, Etercure 6422, Etercure 6423, Etercure 6425, Etercure 6430, Etercure 645 and Etercure 647 manufactured by Eternal Materials Co., Ltd.

In the present invention, the amine-modified oligomer is preferably an oligomer containing a (meth)acryloyl group in the molecule. Specific examples of such an amine-modified oligomer include commercially available products, for example, EBECRYL 80, EBECRYL 81, EBECRYL 83 and EBECRYL 7100 manufactured by Daicel-Allnex Ltd.; LAROMER PO 83F, LAROMER PO 84F and LAROMER PO 94F manufactured by BASF SE; PHOTOMER 4775 F and PHOTOMER 4967 F manufactured by Cognis Corporation; and CN501, CN503, CN550, CN383, CN384 and CN371 manufactured by Sartomer. Such amine-modified oligomers can also be produced by, for example, a Michael addition reaction of primary amine and acrylate. The presence of a (meth)acryloyl group in a molecule easily allows for incorporation into a cured film by polymerization, and therefore is preferable from the viewpoint of an enhancement in curing rate and from the viewpoint of suppression of migration and blooming.

The content of the amine-modified oligomer is 0.5 mass % to 10 mass % and is preferably 0.5 mass % to 6.0 mass % based on the total mass of the actinic radiation-curable inkjet ink composition. If the content of the amine-modified oligomer is less than 0.5 mass %, ink curability is insufficient. If the content of the amine-modified oligomer is more than 10 mass %, storage stability and jetting ability are deteriorated.

<Pigment>

The inkjet ink composition of the present invention contains at least one of various known pigments.

Any pigment that can be contained in the inkjet ink composition of the present invention is listed as follows.

C. I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, 213

C. I. Pigment Red 5, 7, 12, 22, 38, 48:1, 48:2, 48:4, 49:1, 53:1, 57:1, 63:1, 101, 112, 122, 123, 144, 146, 168, 184, 185, 202

C. I. Pigment Violet 19, 23

C. I. Pigment Blue 1, 2, 3, 15:1, 15:2, 15:3, 15:4, 18, 22, 27, 29, 60

C. I. Pigment Green 7, 36

C. I. Pigment White 6, 18, 21

C. I. Pigment Black 7

The volume average particle size of the pigment is preferably from 0.08 to 0.5 μm, and the maximum particle size of the pigment is from 0.3 to 10 μm and is preferably from 0.3 to 3 μm. The particle size of the pigment can be adjusted to thereby suppress clogging in the nozzles of a recording head for ink-discharging, allowing storage stability of the ink, ink transparency and curing sensitivity to be maintained.

The content of the pigment is preferably from 0.1 to 20 mass % and is more preferably from 0.4 to 10 mass % based on the total mass of the actinic radiation-curable inkjet ink composition. If the content of the pigment is excessively low, color exhibition of an image to be obtained is not sufficient, and if the content is excessively high, the ink viscosity is increased to lower the jetting ability.

<Polymer Dispersant>

The inkjet ink composition of the present invention contains a polymer compound containing a tertiary amine group as a functional group that adsorbs the pigment, as a dispersant to the pigment. While the polymer dispersant may also be a compound containing a secondary amine group, which has been used in the prior art, a polymer dispersant containing a tertiary amine group and the above-described amine-modified oligomer are used in combination in the present invention. While the inkjet ink composition contains the above-described amine-modified oligomer and thus is enhanced in curability of the ink composition, storage stability thereof tends to be deteriorated due to its high reactivity. It is considered that, when the polymer dispersant is a polymer dispersant containing a secondary amine group, steric hindrance of a secondary amine site is small to cause an unshared electron pair of amine of the amine-modified oligomer to react with the secondary amine site of the secondary amine dispersant, resulting in loss of the effect as the dispersant. On the other hand, it is considered that, when the polymer dispersant containing a tertiary amine group is adopted, steric hindrance of a tertiary amine site is larger than that of a secondary amine site and therefore, even if reactivity of the amine-modified oligomer is high, reactivity with the tertiary amine site can be suppressed and the effect as the dispersant can be enhanced.

Furthermore, when the ink composition is a gel ink composition containing a gelling agent described later, the amine-modified oligomer and the polymer dispersant containing a tertiary amine group are contained to thereby suppress blooming. The reason for this is considered because the crosslinking density of a cured film to be formed by polymerizing and crosslinking the amine-modified oligomer and the curable monomer due to the occurrence of a chain transfer reaction from an amine portion incorporated in the cured film is increased, allowing movement of the gelling agent in the cured film to be restricted, to hardly cause the gelling agent to be precipitated on the surface of the cured film.

As the polymer dispersant containing a tertiary amine group, a commercially available polymer dispersant containing a tertiary amine group, such as BYK-2164, BYK N-22024 or BYK JET-9151 can be used.

Hydrogen in any amine in a comb-like block copolymer having a secondary or primary amine group may be replaced with another substituent by a known method to convert the amine to a tertiary amine. For example, a secondary amine or primary amine in the comb-like block copolymer can be reacted with an alcohol such as decyl alcohol in the presence of a reduction catalyst to provide a tertiary amine substituted with an alkyl group.

The content of the polymer dispersant is from 20 mass % to 70 mass %, more preferably from 20 to 45 mass % and is further preferably from 30 to 40 mass % based on the total mass of the pigment. If the content of the polymer dispersant relative to the pigment is excessively high, storage stability and jetting ability are deteriorated.

In the case of the gel ink composition containing a gelling agent described later, if the content of the polymer dispersant relative to the pigment is excessively high, the polymer dispersant and the gelling agent are associated with each other, thereby causing inhibition of gelation. Therefore, pinning is not controlled in deposition of an ink droplet, and so-called liquid gathering where the droplets are expanded and mutually overlapped is caused to deteriorate image quality. On the other hand, if the content of the polymer dispersant relative to the pigment is low, the dispersant for coating the surface of the pigment lacks, and an enhancement in storage stability cannot be expected.

The dispersant adsorbs onto the surface of the pigment mainly due to interaction with a polar group. Examples of the interaction with a polar group include one aiming at an ionic bond, a hydrogen bond or the like, and an amine group, a quaternary ammonium salt, a carboxyl group or the like is used. The tertiary amine group in the present invention includes a tertiary amine and a quaternary ammonium salt.

The polymer dispersant preferably has a comb-like block structure. The reason is because a dispersant having a block copolymer (comb-like) structure, as the polymer dispersant, is particularly used to easily allow the steric hindrance effect of suppressing pigment aggregation due to elongation of a side chain to be achieved, resulting in an enhancement in dispersibility of the pigment. The block copolymer (comb-like) refers to a copolymer where another type of polymer as a side chain with respect to one monomer unit constituting the main chain is graft-polymerized to a straight-chain polymer forming the main chain. The comb-like block copolymer, having a tertiary amine, is thus increased in electron density of amine as a functional group having adsorption ability to the pigment, to exert a strong basicity, and thus can strongly adsorb to an acidic group on the pigment surface.

The actinic radiation-curable inkjet ink may comprise, if necessary, a dispersion aid. The dispersion aid may be selected depending on the pigment.

In addition to the above-described polymer dispersant, for example, a hydroxy group-containing carboxylic acid ester, a salt of long chain polyaminoamide and high molecular weight acid ester, a salt of high molecular weight polycarboxylic acid, a salt of long chain polyaminoamide and polar acid ester, high molecular weight unsaturated acid ester, a high molecular weight copolymer, modified polyurethane, modified polyacrylate, an anionic surfactant of polyetherester type, a naphthalenesulfonic acid-formalin condensate salt, an aromatic sulfonic acid-formalin condensate, polyoxyethylene alkyl phosphoric acid ester, polyoxyethylene nonyl phenyl ether, stearylamine acetate, and the like may be contained. Examples of commercially available polymer dispersants include SOLSPERSE series of Avecia and PB series of Ajinomoto Fine-Techno Co., Inc.

<Gelling Agent>

The actinic radiation-curable inkjet ink composition of the present invention preferably further comprises a gelling agent. The ink composition can comprise a gelling agent, to thereby undergo sol-gel phase transition due to the change in temperature.

When the gelling agent is crystallized in an ink, a space three-dimensionally surrounded by crystals, a crystallization product of the gelling agent, is preferably formed. A structure in which a space three-dimensionally surrounded by crystals of the gelling agent is formed may be referred to as a "card house structure". Once the card house structure is formed, the curable monomer can be included in a space three-dimensionally surrounded by crystals of the gelling agent to maintain the liquid curable monomer, and ink droplets can be pinned. Accordingly, color mixing among liquid droplets can be prevented. From the viewpoint of forming the card house structure, the curable monomer and the gelling agent which are dissolved in the ink are preferably compatible each other.

For stably discharging the droplets of the ink from an inkjet recording apparatus, it is preferable that compatibility between the curable monomer and the gelling agent be good in an ink in a sol state (at high temperatures, for example, approximately 80° C.).

Examples of the gelling agent include:

aliphatic ketone compounds; aliphatic ester compounds; petroleum wax such as paraffin wax, microcrystalline wax, and petrolatum; plant wax such as candelilla wax, carnauba wax, rice bran wax, Japan wax, jojoba oil, jojoba solid wax, and jojoba esters; animal wax such as beeswax, lanoline, and whale wax; mineral wax such as montan wax and hydrogenated wax; hydrogenated castor oil and hydrogenated castor oil derivatives; modified wax such as montan wax derivatives, paraffin wax derivatives, microcrystalline wax derivatives, or polyethylene wax derivatives; higher fatty acids such as behenic acid, arachidic acid, stearic acid, palmitic acid, myristic acid, lauric acid, oleic acid, and erucic acid; higher alcohols such as stearyl alcohol and behenyl alcohol; hydroxystearic acids such as 12-hydroxystearic acid; 12-hydroxystearic acid derivatives; fatty acid amides such as lauric acid amide, stearic acid amide, behenic acid amide, oleic acid amide, erucic acid amide, ricinoleic acid amide, 12-hydroxystearic acid amide (for example, NIKKA AMIDE series manufactured by Nippon Kasei Chemical Company Limited, ITOWAX series manufactured by Itoh Oil Chemicals Co., Ltd., FATTYAMID series manufactured by Kao Corporation, DIAMID series manufactured by Mitsubishi Chemical Corporation); N-substituted fatty acid amides such as N-stearyl stearic acid amide and N-oleyl palmitic acid amide; special fatty acid amides such as N,N'-ethylene-bis-stearyl amide, N,N'-ethylene-bis-12-hydroxystearyl amide, and N,N'-xylylene-bis-stearyl amide; higher amines such as dodecylamine, tetradecylamine, or octadecylamine; fatty acid ester compounds such as stearyl stearate, oleyl palmitate, glycerin fatty acid esters, sorbitan fatty acid esters, propylene glycol fatty acid esters, ethylene glycol fatty acid esters, and polyoxyethylene fatty acid esters (for example, EMALLEX series manufactured by Nihon Emulsion Co., Ltd., RIKEMAL series manufactured by RIKEN VITAMIN CO., LTD., and POEM series manufactured by RIKEN VITAMIN CO., LTD.); esters of a sucrose fatty acid such as sucrose stearate and sucrose palmitate (for example, RYOTO Sugar Ester series manufactured by Mitsubishi-Chemical Foods Corporation); synthetic wax such as polyethylene wax and α-olefin-maleic anhydride copolymer wax (such as UNILIN series manufactured by Baker Petrolite—Coatings); dimer acids; dimer diols (such as PRIPOR series manufactured by Croda International Plc); inulin fatty acid esters such as stearoyl inulin; dextrin fatty acid esters such as dextrin palmitate and dextrin myristate (such as The Rheopearl series manufactured by Chiba Flour Milling Co., Ltd.); glyceryl behenate/eicosadioate; polyglyceryl behenate/eicosadioate (such as NOMCORT series manufactured by The Nisshin OilliO Group, Ltd.); amide compounds such as N-lauroyl-L-glutamic acid dibutyl amide and N-(2-ethylhexanoyl)-L-glutamic acid dibutyl amide (available from Ajinomoto Fine-Techno Co., Inc.); dibenzylidene sorbitols such as 1,3:2,4-bis-O-benzylidene-D-glycitol (GELL ALL D available from New Japan Chemical Co., Ltd.); and low-molecular oil gelling agents described in Japanese Patent Application Laid-Open Nos. 2005-126507, 2005-255821, and 2010-111790.

The actinic radiation-curable inkjet ink composition of the present invention preferably comprises at least one gelling agent selected from the group consisting of aliphatic ketones, aliphatic esters, higher fatty acids, higher alcohols and amide compounds each having 12 or more carbon atoms, preferably having a straight or branched carbon chain with 12 to 30 carbon atoms. When the gelling agent contains a straight chain with 12 or more carbon atoms, the above-described "card house structure" is easily formed. The gelling agent may contain a branched chain in the structure thereof.

From the viewpoint of more suppressing blooming, the gelling agent is preferably an aliphatic ketone compound or an aliphatic ester compound. That is, the gelling agent is a compound represented by the following formula (G1) or (G2).

$$R1-CO-R2 \quad \text{Formula (G1):}$$

$$R3-COO-R4 \quad \text{Formula (G2):}$$

In formulae (G1) and (G2), R1 to R4 each independently represent an alkyl group containing a C12-30 straight-chain moiety. R1 to R4 may contain a branched moiety.

Examples of the aliphatic ketone compound represented by the formula (G1) include dilignoceryl ketone (C24-C24), dibehenyl ketone (C22-C22), distearyl ketone (C18-C18), dieicosyl ketone (C20-C20), dipalmityl ketone (C16-C16), dimyristyl ketone (C14-C14), dilauryl ketone (C12-C12), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22).

Examples of commercially available aliphatic ketone compounds represented by formula (G1) include 18-Pentatriacontanon (manufactured by Alfa Aeser), Hentriacontan-16-on (manufactured by Alfa Aeser), and Kao Wax T1 (manufactured by Kao Corporation). The aliphatic ketone compounds may be contained in the inks singly or as a mixture of two or more types thereof.

Examples of the aliphatic ester compound represented by formula (G2) include behenyl behenate (C21-C22), icosyl icosanoate (C19-C20), stearyl stearate (C17-C18), palmityl stearate (C17-C16), lauryl stearate (C17-C12), cetyl palmitate (C15-C16), stearyl palmitate (C15-C18), myristyl myristate (C13-C14), cetyl myristate (C13-C16), octyldodecyl myristate (C13-C20), stearyl oleate (C17-C18), stearyl erucate (C21-C18), stearyl linoleate (C17-C18), behenyl oleate (C18-C22), myricyl cerotate (C25-C16), stearyl montanate (C27-C18), behenyl montanate (C27-C22), arachidyl linoleate (C17-C20), and palmityl triacontanoate (C29-C16).

Examples of commercially available aliphatic ester compounds represented by formula (G2) include UNISTAR M-2222SL (manufactured by NOF CORPORATION), EXCEPARL SS (manufactured by Kao Corporation), EMALEX CC-18 (manufactured by Nihon Emulsion Co., Ltd.), AMREPS PC (manufactured by KOKYU ALCOHOL KOGYO CO., LTD.), EXCEPARL MY-M (manufactured by Kao Corporation), Spermaceti (manufactured by NOF CORPORATION), EMALEX CC-10 (manufactured by Nihon Emulsion Co., Ltd.). These commercially available products are often mixtures of two or more types of the aliphatic ester compounds and therefore may be separated/purified, if necessary.

Besides, a fatty acid ester compound such as a glycerin fatty acid ester, a sorbitan fatty acid ester, a propylene glycol fatty acid ester, an ethylene glycol fatty acid ester, or a polyoxyethylene fatty acid ester (for example, EMALLEX series manufactured by Nihon Emulsion Co., Ltd, RIKEMAL series manufactured by RIKEN VITAMIN CO., LTD., or POEM series manufactured by RIKEN VITAMIN CO., LTD.) may be used in combination in order to adjust the crystal growth of the gelling agent.

When the actinic radiation-curable inkjet ink composition of the present invention contains the gelling agent, the content of the gelling agent is preferably from 0.5 mass % to 10 mass %, more preferably from 1 mass % to 7 mass % and is further preferably from 1.5% mass % to 5 mass % based on the total mass of the actinic radiation-curable inkjet ink composition.

<Additional Components>

If necessary, the actinic radiation-curable inkjet ink composition may further comprise additional component(s). The additional components can be various additives and other resins containing no tertiary amine group. Examples of the additive include surfactants, leveling additives, matting agents, UV absorbers, IR absorbers, antibacterial agents, and basic compounds for improving the storage stability of the ink. Examples of the basic compounds include basic alkali metal compounds and basic alkali earth metal compounds. Examples of the other resins containing no tertiary amine group include resins for adjusting the physical properties of a cured film, and examples of the resins include polyester resins, polyurethane resins, vinyl resin, acrylic resins, rubber resins, and waxes.

The inkjet ink composition of the present invention is preferably obtained by preparing a pigment dispersion and further mixing the pigment dispersion and other ink components (curable monomer, photopolymerization initiator, amine-modified oligomer and gelling agent). The pigment dispersion can be obtained by dispersing the pigment and the polymer dispersant in a dispersion medium. Dispersing of the pigment may be performed, for example, by using a ball mill, a sand mill, an attritor, a roll mill, an agitator, a Henschel mixer, a colloid mill, an ultrasonic homogenizer, a pearl mill, a wet jet mill, a paint shaker, or the like. The mixed liquid obtained is preferably filtered through a predetermined filter.

[Inkjet Recording Process]

The inkjet recording process comprises 1) jetting the above-described actinic radiation-curable inkjet ink composition from a recording head for jetting, to deposit the ink composition on a recording medium, and 2) irradiating the ink deposited on the recording medium with actinic radiation to cure the above-described ink.

In the jetting 1), the inkjet ink composition received in an ink tank is jetted as droplets through a nozzle of the recording head for ink jetting towards the recording medium, and deposited on the recording medium. When the inkjet ink composition is a gel ink composition containing a gelling agent, the temperature of the inkjet ink composition received in the recording head for ink jetting is a temperature so that the content of the gelling agent in the inkjet ink composition is equal to or less than the amount of the gelling agent saturated and dissolved in the inkjet ink composition. That is, the gelling agent is dissolved as much as possible in the inkjet ink composition received in the recording head for ink-jetting.

In the curing 2), the ink composition deposited on the recording medium is irradiated with actinic radiation. The actinic radiation for irradiation may be appropriately selected depending on the type of the curable monomer, and preferably corresponds to ultraviolet rays, electron beams, and the like.

An inkjet recording apparatus of actinic radiation curable inkjet type will be described. The inkjet recording apparatus of actinic radiation curable inkjet type includes an inkjet recording apparatus of line recording type (single pass recording type) and an inkjet recording apparatus of serial recording type. The inkjet recording apparatus may be selected depending on the resolution and the recording speed of an image to be demanded, and is preferably an inkjet recording apparatus of line recording type (single pass recording type).

The inkjet recording apparatus of line recording type has a head carriage for accommodating a plurality of recording heads for ink-jetting, and an actinic radiation irradiation section which covers the entire width of the recording medium and which is disposed at a downstream side of the head carriage (conveyance direction of the recording medium).

The head carriage is fixedly disposed so as to cover the entire width of the recording medium and accommodates a plurality of recording heads for ink-jetting, provided for each color. The recording heads for ink-jetting are designed so that the ink is supplied. For example, the ink can be supplied directly from an ink cartridge or the like that is added in a freely-mountable manner to the inkjet recording apparatus, or by ink supply means.

A plurality of recording heads for ink-jetting is disposed for each color in the conveyance direction of the recording medium. The number of the recording heads for ink jetting disposed in the conveyance direction of the recording medium is determined based on the nozzle density of the recording heads for ink jetting and the resolution of an image to be printed. For example, an image having a resolution of 1,440 dpi is formed by using recording heads for ink-jetting, with a droplet volume of 2 pl and a nozzle density of 360 dpi, four recording heads for ink jetting can be disposed in a staggered manner relative to the conveyance direction of the recording medium. Further, when an image having a resolution of 720×720 dpi is formed by using recording heads for ink-jetting, with a droplet volume of 6 pl and a nozzle density of 360 dpi, two recording heads for ink jetting can be disposed in a staggered manner. Herein, dpi represents the number of ink droplets (dots) per 2.54 cm.

The actinic radiation irradiation section covers the entire width of the recording medium, and is disposed at a downstream side of the head carriage relative to the conveyance direction of the recording medium. The actinic radiation irradiation section irradiates the liquid droplets discharged from the recording heads for ink-jetting and deposited on the recording medium with actinic radiation to cure the liquid droplets.

When the actinic radiation corresponds to ultraviolet rays, examples of an actinic radiation irradiation section (ultraviolet irradiation means) include fluorescent lamps (low-pressure mercury lamp and sterilization lamp), a cold cathode fluorescent lamp, ultraviolet laser, low-pressure, medium-pressure and high-pressure mercury lamps having an operating pressure of several hundred Pa to 1 MPa, a metal halide lamp, and LED. From the viewpoint of curability, ultraviolet irradiation means that emits ultraviolet rays at an illuminance of 100 mW/cm$^2$ or more; specifically, a high-pressure mercury lamp, a metal halide lamp, LED, and the like are preferable, and LED is more preferable from the viewpoint of small power consumption. Specifically, water cooling LED (395 nm) manufactured by Phoseon Technology can be used.

When the actinic radiation corresponds to electron beams, examples of an actinic radiation irradiation section (electron beam irradiation means) include scanning type, curtain beam type, and broad beam type electron beam irradiation means, and curtain beam type electron beam irradiation means is preferable from the viewpoint of processing capacity. Examples of the electron beam irradiation means include "Curetron EBC-200-20-30" manufactured by Nisshin High Voltage Co., Ltd. and "Min-EB" manufactured by AIT Corporation.

EXAMPLES

Hereinafter, the present invention will be described specifically giving Examples, but the present invention is not limited to these Examples. It is to be noted that the term "parts" or "%" used in Examples represents "parts by weight" or "mass %" unless otherwise noted.

[Production of Pigment Dispersion]

Each of dispersions 1 to 12 was prepared according to the following procedures by use of the pigment and the polymer dispersant shown in Table 1 below.

The following curable monomer, polymerization inhibitor and polymer dispersant were put into a thermobath at 55° C. of a 200-cc polyethylene vessel (with a lid), heated and stirred using a magnet stirrer for 30 minutes, and dissolved. After the solution obtained was cooled to room temperature, the total amount of the following pigment was added thereto and well stirred. Thereafter, the resultant mixture was put into a glass bottle together with 100 g of zirconia beads having a diameter of 0.5 mm to seal the glass bottle, and subjected to vibration dispersion by a vibration mill (Red devil 5400HC) for 2 hours. Thereafter, the zirconia beads were removed to obtain a pigment dispersion.

Polymerization inhibitor: 0.1 parts by weight of IRGASTAB UV10 (radical polymerization inhibitor, manufactured by BASF SE)

Polymer dispersant: type and amount described in Table 1

Pigment: 20 parts by weight of pigment described in Table 1

Curable monomer: polyethylene glycol (400) diacrylate

The amount of the curable monomer to be used was here adjusted so that the total amount of the polymerization inhibitor, the polymer dispersant and the curable monomer was 100 parts by weight.

pigment dispersion, the curable monomer, the photopolymerization initiator, the polymerization inhibitor, the amine-modified oligomer and the gelling agent.

Each of the curable monomer, the photopolymerization initiator, the polymerization inhibitor and the amine-modified oligomer was weighed in a compositional ratio described in Table 3 or Table 4, and thereafter put into a dissolution beaker and stirred for 30 minutes. The pigment dispersion was added thereto and stirred for another 30 minutes. The mixture obtained by mixing the respective components was heated to 80° C., and further stirred for 30 minutes. Thereafter, the resultant mixture was subjected to filtration through a methoprene filter (nominal filtration

TABLE 1

|  | Pigment | Manufacturing company | Dispersant* | Amount of dispersant (parts by weight) | Adsorption group | Polymer type | Amount of dispersant relative to pigment |
| --- | --- | --- | --- | --- | --- | --- | --- |
| Dispersion 1 | Cromophtal Jet Magenta 2BC | BASF | BYK-2164 | 7 | Tertiary amine | Block | 35% |
| Dispersion 2 | Cromophtal Jet Magenta 2BC | BASF | BYK-168 | 7 | Tertiary amine | Block | 35% |
| Dispersion 3 | Cromophtal Jet Magenta 2BC | BASF | BYK N-22024 | 14 | Tertiary amine | Comb-like | 70% |
| Dispersion 4 | Cromophtal Jet Magenta 2BC | BASF | BYK JET-9151 | 4 | Tertiary amine | Comb-like | 20% |
| Dispersion 5 | Paliotol Yellow D-1155 | BASF | BYK JET-9151 | 7 | Tertiary amine | Comb-like | 35% |
| Dispersion 6 | MA-7 | Mitsubishi Chemical | BYK JET-9151 | 7 | Tertiary amine | Comb-like | 35% |
| Dispersion 7 | FASTOGEN Blue 5485 | DIC | BYK JET-9151 | 7 | Tertiary amine | Comb-like | 35% |
| Dispersion 8 | FASTOGEN Blue 5485 | DIC | BYK JET-9151 | 7 | Tertiary amine | Comb-like | 50% |
| Dispersion 9 | FASTOGEN Blue 5485 | DIC | BYK JET-9151 | 12 | Tertiary amine | Comb-like | 15% |
| Dispersion 10 | FASTOGEN Blue 5485 | DIC | BYK JET-9151 | 16 | Tertiary amine | Comb-like | 80% |
| Dispersion 11 | FASTOGEN Blue 5485 | DIC | PB824 | 7 | Primary amine | Block | 35% |
| Dispersion 12 | FASTOGEN Blue 5485 | DIC | BYK-2091 | 7 | Secondary amine | Block | 35% |

*Polymer dispersant: PB824 manufactured by Ajinomoto Fine-Techno Co., Inc., and others manufactured by BYK Examples 1 to 14 and Comparative Examples 1 to 5

Each ink composition was prepared by the following method according to the composition of each ink composition described in Table 3 or Table 4 below by use of the accuracy: 3 μm, SLS030 manufactured by Roki Techno Co., Ltd.), and thereafter cooled to obtain each ink composition.

The detail of the components used for preparing the ink composition of each of Examples and Comparative Examples of the present application is as described in Table 2 below.

TABLE 2

|  | Compound type | Product name | Manufacturer | Presence of absorption maximum at 360 nm or more |
| --- | --- | --- | --- | --- |
| Curable monomer | Polyethylene glycol (400) diacrylate | SR344 | Sartomer |  |
|  | Polyethylene glycol (600) diacrylate | SR610 | Sartomer |  |
|  | Ethoxylated (9) trimethylolpropane triacrylate | SR502 | Sartomer |  |
|  | Propoxylated (3) trimethylolpropane triacrylate | SR492 | Sartomer |  |
|  | Tripropylene glycol diacrylate | SR306 | Sartomer |  |

TABLE 2-continued

| | Compound type | Product name | Manufacturer | Presence of absorption maximum at 360 nm or more |
|---|---|---|---|---|
| | Ethoxylated (3) trimethylolpropane triacrylate | SR454 | Sartomer | |
| | 2-Phenoxyethyl acrylate | SR339 | Sartomer | |
| Amine-modified oligomer | — | CN371 | Sartomer | |
| | — | EBECRYL7100 | Daicel | |
| | — | EBECRYL80 | Daicel | |
| Photo-polymerization initiator | — | Irgacure 819 | BASF | Presence |
| | — | Lucirin TPO | BASF | Presence |
| | — | Irgacure 907 | BASF | Absence |
| | — | ITX | — | Presence |
| Polymerization inhibitor | — | UV-10 | BASF | |
| Gelling agent | Distearyl ketone | Kao Wax T1 | Kao | |
| | Stearyl stearate | Exceparl SS | Kao | |
| | Behenic acid | Lunac BA | Kao | |
| | Palmitic acid amide | Diamid KP | Mitsubishi Chemical | |
| | Monoglyceride pentacosylate | Poem B100 | Riken Vitamin | |

[Image Forming Method]

A monochrome image was formed with the actinic radiation-curable inkjet ink composition obtained in each of Examples and Comparative Examples by use of a line type inkjet recording apparatus (HA512 manufactured by Konica Minolta Inc.). The temperature of the recording head for ink jetting of the inkjet recording apparatus was set to 80° C. A 100% solid print was formed over an area of 100 mm in width×300 mm in length at a resolution of 720 dpi×720 dpi, with operation at an amount of ink droplets of 8 pL and at a voltage value of 16 V. Thereafter, the ink surface was cured by irradiation with ultraviolet rays having an energy of 250 mJ by an LED lamp (manufactured by Kyocera Corporation). As the recording medium for printing, OK Top coated paper was used.

The ink compositions prepared and the image formed as described above were evaluated according to the following methods.

[Evaluation of Storage Stability]

The actinic radiation-curable inkjet ink composition obtained in each of Examples and Comparative Examples was subjected to viscosity measurement with a rotation type viscoelasticity measuring apparatus at 80° C., and thereafter stored under a condition of 100° C. for one week. After the storage, the viscosity was measured again at 80° C. The difference in viscosity before and after the storage (namely, viscosity variation) was determined, and the storage stability was evaluated with the viscosity variation based on the following criteria.

A: viscosity variation was 0 cP or more and less than 0.5 cP

B: viscosity variation was 0.5 cP or more and less than 1.0 cP

D: viscosity variation was 1.0 cP or more

[Evaluation of Jetting Ability]

The image formed using the actinic radiation-curable inkjet ink composition obtained in each of Examples and Comparative Examples was subjected to evaluation of the jetting ability of the ink composition. Specifically, the number of missing dots generated on fifty fine lines formed using each ink composition was visually counted.

A: the number of missing dots was less than 5

B: the number of missing dots was 5 or more and less than 10

C: the number of missing dots was 10 or more and less than 20

D: the number of missing dots was 20 or more

[Evaluation of Curability (Pencil Hardness)]

The $10^{th}$ image formed by use of the actinic radiation-curable inkjet ink composition obtained in each of Examples and Comparative Examples was left to stand under an environment of 25° C. and 60% RH for 24 hours. Thereafter, the pencil hardness of the surface of the 100% print part in the image was measured according to JIS K 5400, and the curability was evaluated based on the following criteria.

B: the pencil hardness was 2H or more

C: the pencil hardness was B, F or H

D: the pencil hardness was 2B or less

[Evaluation of Bending Resistance]

The $10^{th}$ image formed on OK Top paper by use of the actinic radiation-curable inkjet ink composition obtained in each of Examples and Comparative Examples was left to stand under an environment of 25° C. and 60% RH for 24 hours. Thereafter, the image was doubled up, and breakage of an image film was visually confirmed and evaluated based on the following criteria.

B: the image film was not broken

C: the image film was slightly cracked on the part doubled up

D: the image film was broken on the part doubled up

The evaluation results are shown together with the composition of each ink composition in Table 3 and Table 4.

TABLE 3

|  |  | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|---|
| Dispersion | Dispersion 1 | 20% | | | | | | | | | | | | | |
|  | Dispersion 2 | | 20% | | | | | | | | | | | | |
|  | Dispersion 3 | | | 20% | | | | | | | | | | | |
|  | Dispersion 4 | | | | 20% | | | | | | | | | | |
|  | Dispersion 5 | | | | | 20% | | | | | | | | | |
|  | Dispersion 6 | | | | | | 20% | | | | | | | | |
|  | Dispersion 7 | | | | | | | 20% | | | | | | | |
|  | Dispersion 8 | | | | | | | | 20% | | | | | | |
|  | Dispersion 9 | | | | | | | | | 20% | | | | | |
|  | Dispersion 10 | | | | | | | | | | 20% | | | | |
|  | Dispersion 11 | | | | | | | | | | | 20% | | | |
|  | Dispersion 12 | | | | | | | | | | | | 20% | 20% | 20% |
| Curable monomer | SR344 | 20% | 20% | 20% | 20% | 20% | 20% | 20% | 20% | 20% | 20% | 20% | 5% | 20% | 5% |
|  | SR502 | 20% | 20% | 20% | 20% | 20% | 22% | 20% | 20% | 18% | 15% | 21% | 5% | 15% | 35% |
|  | SR492 | 20% | 20% | 20% | 20% | 20% | 20% | 20% | 20% | 20% | 20% | 20% | 30% | 20% | 30% |
|  | SR306 | 10% | 10% | 10% | 10% | 10% | 10% | 10% | 10% | 10% | 10% | 10% | 30% | 10% | |
|  | SR339 | | | | | | | | | | | | | 5% | |
| Photo-polymerization initiator | Irgacure 819 | 3% | 3% | 3% | 3% | 3% | 3% | 3% | 3% | 3% | 3% | | 3% | 3% | 3% |
|  | Lucirin TPO | 3% | 3% | 3% | 3% | 3% | 3% | 3% | 3% | 3% | 3% | | 3% | 3% | 3% |
|  | Irgacure 907 | | | | | | | | | | | 6% | | | |
|  | ITX | | | | | | | | | | | | | | |
| Polymerization inhibitor | UV-10 | 1% | 1% | 1% | 1% | 1% | 1% | 1% | 1% | 1% | 1% | 0.1% | 1% | 1% | 1% |
|  |  | 0.1% | 0.1% | 0.1% | 0.1% | 0.1% | 0.1% | 0.1% | 0.1% | 0.1% | 0.1% | | 0.1% | 0.1% | 0.1% |
| Amine-modified oligomer | CN371 | 3% | 3% | 3% | 3% | 3% | 1% | 3% | 3% | | | 3% | 3% | 3% | 3% |
|  | EBECRYL 7100 | | | | | | | | | 5% | | | | | |
|  | EBECRYL80 | | | | | | | | | | 8% | | | | |
|  | Total of PO | 30% | 30% | 30% | 30% | 30% | 30% | 30% | 30% | 30% | 30% | 30% | 60% | 30% | 65% |
| Evaluation | Total | 100% | 100% | 100% | 100% | 100% | 100% | 100% | 100% | 100% | 100% | 100% | 100% | 100% | 100% |
|  | Storage stability | C | C | A | A | B | A | A | A | B | A | B | A | A | A |
|  | Jetting ability | B | B | B | B | B | B | B | B | B | C | B | B | B | B |
|  | Curability | B | B | B | B | B | B | B | B | B | B | C | B | C | B |
|  | Bending resistance | B | B | B | B | B | B | B | B | B | B | B | C | B | C |

TABLE 4

|  |  | Comparative Example 1 | Comparative Example 2 | Comparative Example 3 | Comparative Example 4 | Comparative Example 5 |
| --- | --- | --- | --- | --- | --- | --- |
| Dispersion | Dispersion 1 |  |  |  |  |  |
|  | Dispersion 2 |  |  |  |  |  |
|  | Dispersion 3 |  |  |  |  |  |
|  | Dispersion 4 |  |  |  |  |  |
|  | Dispersion 5 |  |  |  |  |  |
|  | Dispersion 6 |  |  |  |  |  |
|  | Dispersion 7 |  |  |  |  | 20% |
|  | Dispersion 8 |  |  |  |  |  |
|  | Dispersion 9 | 20% |  |  |  |  |
|  | Dispersion 10 |  | 20% |  |  |  |
|  | Dispersion 11 |  |  | 20% |  |  |
|  | Dispersion 12 |  |  |  | 20% |  |
| Curable monomer | SR344 | 20% | 20% | 20% | 20% | 20% |
|  | SR502 | 20% | 20% | 20% | 20% | 11% |
|  | SR492 | 20% | 20% | 20% | 20% | 20% |
|  | SR306 | 10% | 10% | 10% | 10% | 10% |
|  | SR339 |  |  |  |  |  |
| Photo-polymerization initiator | Irgacure 819 | 3% | 3% | 3% | 3% | 3% |
|  | Lucirin TPO | 3% | 3% | 3% | 3% | 3% |
|  | Irgacure 907 |  |  |  |  |  |
|  | ITX | 1% | 1% | 1% | 1% | 1% |
| Polymerization inhibitor | UV-10 | 0.1% | 0.1% | 0.1% | 0.1% | 0.1% |
| Amine-modified oligomer | CN371 | 3% | 3% | 3% | 3% | 12% |
|  | EBECRYL7100 |  |  |  |  |  |
|  | EBECRYL80 |  |  |  |  |  |
|  | Total of PO | 30% | 30% | 30% | 30% | 30% |
|  | Total | 100% | 100% | 100% | 100% | 100% |
| Evaluation | Storage stability | D | D | D | D | D |
|  | Jetting ability | D | D | D | D | D |
|  | Curability | B | B | B | B | B |
|  | Bending resistance | B | B | B | B | B |

As clear from the results shown in Table 3 and Table 4 above, the ink composition of each of Examples 1 to 13, including 0.5 mass % to 10 mass % of the amine-modified oligomer based on the total mass of the actinic radiation-curable inkjet ink composition and 20 mass % to 70 mass % of the compound containing a tertiary amine group as the polymer dispersant relative to the pigment was excellent in storage stability and also excellent in jetting ability, curability and bending resistance. In particular, a particularly high storage stability was achieved in Examples 3 to 10 and 12 where the comb-like compound containing a tertiary amine group was used as the polymer dispersant and the photopolymerization initiator was the compound having an absorption maximum at 360 nm or more.

On the other hand, the ink composition of each of Comparative Example 1 where the amount of the polymer dispersant was less than 20 mass %, Comparative Example 2 where the amount of the polymer dispersant was more than 70 mass %, and Comparative Examples 3 and 4 where the polymer dispersant was the compound containing a primary amine group or a secondary amine group was low in storage stability and jetting ability. The ink composition in Comparative Example 5 where the content of the amine-modified oligomer was more than 10 mass % based on the total mass of the actinic radiation-curable inkjet ink composition was also low in storage stability and jetting ability.

Examples 15 to 30 and Comparative Example 6

Each gel ink composition was prepared by the following method according to the composition of each ink composition described in Table 5 and Table 6 below by use of the pigment dispersion, the curable monomer, the photopolymerization initiator, the polymerization inhibitor, the amine-modified oligomer and the gelling agent.

Each of the curable monomer, the photopolymerization initiator, the polymerization inhibitor, the amine-modified oligomer inhibitor and the amine-modified oligomer was weighed in a compositional ratio described in Table 5 or Table 6, and thereafter put into a dissolution beaker and stirred for 30 minutes. The pigment dispersion was added thereto and stirred for another 30 minutes. The gelling agent was added thereto with the mixture obtained by mixing respective components being heated to 80° C., and further stirred for 30 minutes. Thereafter, the resultant mixture was subjected to filtration through a methoprene filter (nominal filtration accuracy: 3 μm, SLS030 manufactured by Roki Techno Co., Ltd.), and cooled to obtain an ink composition.

[Image Forming Method]

A monochrome image was formed with the actinic radiation-curable inkjet ink composition obtained in each of Examples and Comparative Examples by use of a line type inkjet recording apparatus (HA512 manufactured by Konica Minolta Inc.). The temperature of the recording head for ink jetting of the inkjet recording apparatus was set to 80° C. A 100% solid print was formed over an area of 100 mm in width×300 mm in length at a resolution of 720 dpi×720 dpi, with operation at an amount of ink droplets of 8 pL and at a voltage value of 16 V. Thereafter, the ink surface was cured by irradiation with ultraviolet rays having an energy of 250 mJ by an LED lamp (manufactured by Kyocera Corporation). As the recording medium for printing, OK Top coated paper was used.

The ink compositions prepared and the image formed as described above were evaluated according to the following methods.

[Evaluation of Storage Stability]

The storage stability of the resultant ink was evaluated in the same manner as described above.

[Evaluation of Jetting Ability]

The jetting ability of the resultant ink was evaluated in the same manner as described above.

[Evaluation of Blooming]

A solid image of 5 cm×5 cm formed on a recording medium (OK Top Coat, unit basis weight: 128 g/m², manufactured by Oji Paper Co., Ltd.) by the above-described method was stored under an environment of 40° C. for one month. The blooming of the image after the storage was visually observed, and evaluated according to the following criteria.

A: no precipitate was observed on the image surface at all.

B: almost no precipitate was observed on the image surface.

C: any precipitate was slightly present on the image surface, and could be visually confirmed.

D: the image surface was covered with a powdery substance, and such a substance could be visually clearly confirmed.

[Evaluation of Curability]

The curability of the resultant ink was evaluated in the same manner as described above.

The evaluation results are shown together with the composition of each ink composition in Table 5 and Table 6.

TABLE 5

| | | Example 15 | Example 16 | Example 17 | Example 18 | Example 19 | Example 20 | Example 21 | Example 22 | Example 23 | Example 24 | Comparative Example 6 |
|---|---|---|---|---|---|---|---|---|---|---|---|---|
| Dispersion | Dispersion 3 | | | | | | | | | | | |
| | Dispersion 4 | | | | | | | | | | | |
| | Dispersion 7 | 20% | 20% | 20% | 20% | 20% | 20% | 20% | 20% | 20% | 20% | 20% |
| Curable monomer | SR344 | 20% | 20% | 20% | | | | | | | | |
| | SR610 | | | | 20% | 15% | 20% | 20% | 20% | 1% | | 20% |
| | SR502 | 16% | 16% | 16% | 26% | | 20% | 10% | 16% | | 31% | 15% |
| | SR492 | 20% | 20% | 20% | 10% | 40% | 20% | 20% | | 40% | 20% | 20% |
| | SR306 | 10% | 10% | 10% | 10% | 20% | 10% | 10% | 10% | 25% | 10% | 10% |
| | SR454 | | | | | | | | 20% | | | |
| | SR339 | | | | | | | | | | 5% | |
| Photopolymerization initiator | Irgacure 819 | 3% | 3% | 3% | 3% | 3% | 3% | 3% | 3% | 3% | 3% | 3% |
| | Lucirin TPO | 3% | 3% | 3% | 3% | 3% | | 3% | 3% | 3% | 3% | 3% |
| | Irgacure 907 | | | | | | | | | | | |
| | ITX | 1% | 1% | 1% | 1% | 1% | | 1% | 1% | 1% | 1% | 1% |
| Polymerization inhibitor | UV-10 | 0.1% | 0.1% | 0.1% | 0.1% | 0.1% | 0.1% | 0.1% | 0.1% | 0.1% | 0.1% | 0.1% |
| Amine-modified oligomer | CN371 | 3% | 3% | 3% | 3% | 3% | 3% | 3% | 3% | 3% | 3% | |
| | EBECRYL7100 | | | | | | | | | | | |
| Gelling agent | Kao Wax T1 | 2% | | | 2% | 2% | 2% | 5% | 2% | 2% | 2% | 3% |
| | Exceparl SS | 2% | | | 2% | 2% | 2% | 5% | 2% | 2% | 2% | 5% |
| | Lunac BA | | 4% | | | | | | | | | |
| | Diamid KP | | | 2% | | | | | | | | |
| | Poem B100 | | | 2% | | | | | | | | |
| Total of PO | | 30% | 30% | 30% | 20% | 60% | 30% | 30% | 10% | 65% | 30% | 30% |
| | Total | 100% | 100% | 100% | 100% | 100% | 100% | 100% | 100% | 100% | 100% | 100% |
| Evaluation | Storage stability | A | A | A | A | A | A | A | A | A | B | B |
| | Jetting ability | B | B | B | B | B | B | B | C | B | B | B |
| | Blooming | A | B | B | A | A | A | A | C | C | C | C |
| | Curability | B | B | B | B | B | B | B | B | B | C | D |

TABLE 6

| | | Example 25 | Example 26 | Example 27 | Example 28 | Example 29 | Example 30 |
|---|---|---|---|---|---|---|---|
| Dispersion | Dispersion 3 | | | | | 20% | |
| | Dispersion 4 | | | | | | 20% |
| | Dispersion 7 | 20% | 20% | 20% | 20% | | |
| Curable monomer | SR344 | | | | | | |
| | SR610 | 20% | 20% | 20% | 20% | 20% | 20% |
| | SR502 | 16% | 18% | 13% | 22% | 20% | 20% |
| | SR492 | 20% | 20% | 20% | 20% | 20% | 20% |
| | SR306 | 10% | 10% | 10% | 10% | 10% | 10% |
| | SR454 | | | | | | |
| | SR339 | | | | | | |
| Photopolymerization initiator | Irgacure 819 | | 3% | 3% | 3% | 3% | 3% |
| | Lucirin TPO | | | | | | |
| | Irgacure 907 | 6% | | | | | |
| | ITX | | | | | | |
| Polymerization inhibitor | UV-10 | 0.1% | 0.1% | 0.1% | 0.1% | 0.1% | 0.1% |
| Amine-modified oligomer | CN371 | 3% | | 10% | 1% | 3% | 3% |
| | EBECRYL7100 | | 5% | | | | |

TABLE 6-continued

| | | Example 25 | Example 26 | Example 27 | Example 28 | Example 29 | Example 30 |
|---|---|---|---|---|---|---|---|
| Gelling agent | Kao Wax T1 | 3% | 2% | 2% | 2% | 2% | 2% |
| | Exceparl SS | 5% | 2% | 2% | 2% | 2% | 2% |
| | Lunac BA | | | | | | |
| | Diamid KP | | | | | | |
| | Poem B100 | | | | | | |
| | Total of PO | 30% | 30% | 30% | 20% | 60% | 30% |
| | Total | 100% | 100% | 100% | 100% | 100% | 100% |
| Evaluation | Storage stability | A | A | A | A | A | A |
| | Jetting ability | B | B | B | B | B | B |
| | Blooming | A | A | A | A | A | A |
| | Curability | C | B | B | B | B | B |

As clear from the results shown in Table 5 and Table 6 above, the gel ink composition of each of Examples 14 to 29, including 0.5 mass % to 10 mass % of the amine-modified oligomer based on the total mass of the actinic radiation-curable inkjet ink composition and 20 mass % to 70 mass % of the compound containing a tertiary amine group as the polymer dispersant relative to the pigment was excellent in storage stability, jetting ability and curability, and was also suppressed in the occurrence of blooming. In particular, the gel ink composition where the gelling agent was at least one member selected from the group consisting of an aliphatic ketone and an aliphatic ester and furthermore 20 to 60 mass % of the PO-modified polyfunctional monomer was contained as the curable monomer, and the gel ink composition containing no monofunctional monomer (each of Examples 15, 19 to 21, and 25 to 30) exerted a particularly excellent blooming-suppression effect. In addition, when the photopolymerization initiator was the compound having an absorption maximum at 360 nm or more, the curability was enhanced (Examples 15 to 24 and 26 to 30).

On the other hand, the gel ink composition of Comparative Example 6, containing no amine-modified oligomer, was low in curability, and the occurrence of blooming was also observed.

The present application claims the priority based on Japanese Patent Application No. 2015-213942 filed on Oct. 30, 2015. The content described in the specification of the Application is herein incorporated in its entirety.

INDUSTRIAL APPLICABILITY

The actinic radiation-curable inkjet ink composition of the present invention is an ink composition excellent in curability and high in storage stability, and thus has no problem of deterioration in image quality due to prolonged storage of the ink. When the actinic radiation-curable inkjet ink composition of the present invention is a gel ink composition containing a gelling agent, not only the above-described curability and storage stability are achieved, but also the occurrence of blooming is suppressed, and thus a high-quality color image can be formed.

The invention claimed is:

1. An actinic radiation-curable inkjet ink composition comprising a curable monomer, a photopolymerization initiator, an amine-modified oligomer, a pigment and a polymer dispersant, wherein
a content of the amine-modified oligomer is 0.5 mass % to 10 mass % based on a total mass of the actinic radiation-curable inkjet ink composition,
the polymer dispersant is a compound containing a tertiary amine group and a content of the polymer dispersant is 20 mass % to 70 mass % relative to the pigment, and
the curable monomer comprises a PO-modified polyfunctional monomer, and a content of the PO-modified polyfunctional monomer is 20 to 60 mass % based on the total mass of the actinic radiation-curable inkjet ink composition.

2. The actinic radiation-curable inkjet ink composition according to claim 1, wherein the amine-modified oligomer has a (meth)acryloyl group in a molecule.

3. The actinic radiation-curable inkjet ink composition according to claim 1 wherein the curable monomer is a radical polymerizable monomer, and the photopolymerization initiator is a radical photopolymerization initiator.

4. The actinic radiation-curable inkjet ink composition according to claim 1, wherein the photopolymerization initiator has an absorption maximum at 360 nm or more.

5. The actinic radiation-curable inkjet ink composition according to claim 1, wherein the curable monomer comprises substantially no monofunctional monomer.

6. An inkjet recording process comprising:
jetting the actinic radiation-curable inkjet ink composition according to claim 1 from a recording head for ink-jetting to thereby deposit the ink composition on a recording medium, and
irradiating the actinic radiation-curable inkjet ink composition deposited on the recording medium with actinic radiation to cure the actinic radiation-curable inkjet ink composition.

7. An actinic radiation-curable inkjet ink composition comprising a curable monomer, a photopolymerization initiator, an amine-modified oligomer, a pigment, a polymer dispersant and a gelling agent,
wherein
a content of the amine-modified oligomer is 0.5 mass % to 10 mass % based on a total mass of the actinic radiation-curable inkjet ink composition,
the polymer dispersant is a compound containing a tertiary amine group and a content of the polymer dispersant is 20 mass % to 70 mass % relative to the pigment,
the gelling agent is at least one member selected from the group consisting of aliphatic ketones, aliphatic esters, higher fatty acids, higher alcohols and amide compounds each having a straight or branched carbon chain having 12 or more carbon atoms,
a content of the gelling agent is 0.5 mass % to 10 mass % based on the total mass of the actinic radiation-curable inkjet ink composition, and the actinic radiation-curable inkjet ink composition undergoes sol-gel phase transition by the change in temperature.

8. An actinic radiation-curable inkjet ink composition comprising a curable monomer, a photopolymerization initiator, an amine-modified oligomer, a pigment and a polymer dispersant and a gelling agent, wherein
a content of the amine-modified oligomer is 0.5 mass % to 10 mass % based on a total mass of the actinic radiation-curable inkjet ink composition, and
the polymer dispersant is a compound containing a tertiary amine group and a content of the polymer dispersant is 20 mass % to 70 mass % relative to the pigment, and
the gelling agent is at least one member selected from the group consisting of aliphatic ketones and aliphatic esters.

* * * * *